A. H. GEDDES.
AUXILIARY TRACTION DEVICE FOR MOTOR VEHICLES.
APPLICATION FILED APR. 22, 1920.

1,398,015.

Patented Nov. 22, 1921.

WITNESSES

INVENTOR
ALBERT H. GEDDES,
BY
ATTORNEYS

UNITED STATES PATENT OFFICE.

ALBERT H. GEDDES, OF BROOKLYN, NEW YORK.

AUXILIARY TRACTION DEVICE FOR MOTOR-VEHICLES.

1,398,015.     Specification of Letters Patent.     Patented Nov. 22, 1921.

Application filed April 22, 1920. Serial No. 375,840.

*To all whom it may concern:*

Be it known that I, ALBERT H. GEDDES, a citizen of the United States, and a resident of the city of New York, borough of Brooklyn, in the county of Kings and State of New York, have invented a new and Improved Auxiliary Traction Device for Motor-Vehicles, of which the following is a full, clear, and exact description.

This invention relates to accessories for motor vehicles and more particularly to an auxiliary traction device therefor.

Many devices have been provided to extricate motor vehicles when the drive wheels of the same have become mired or ditched in such a manner as to destroy their tractive function; however, the said devices invariably employ a tackle which is secured to the drive wheels at one end and anchored at its opposite end to a stump or stake driven in the ground. Many objections and disadvantages to such an arrangement have been noted principally the necessity of carrying a multiplicity of tools for the purpose.

The primary object therefore of the present invention is to provide an auxiliary traction device which overcomes and eliminates the above recited and other objections by providing means for transmitting power from the mired driving wheels to the remaining wheels.

Another object of the invention is to provide a device of the character described which is simple and inexpensive to produce and which is applicable to practically any standard make of motor vehicle now on the market.

A further object of the present invention is to provide a device of the character described which may be set up for use in a minimum time without the necessity of leaving the vehicle as the same can be applied from the running board.

A still further object of the present invention is to provide means for retaining the steering knuckle spindles in alinement to insure an even traction on the driven wheels.

With the above recited and other objects in view, some of which will be apparent hereafter, reference is made to the following description, claims and accompanying drawings forming a part of this application, in which—

Figure 1:
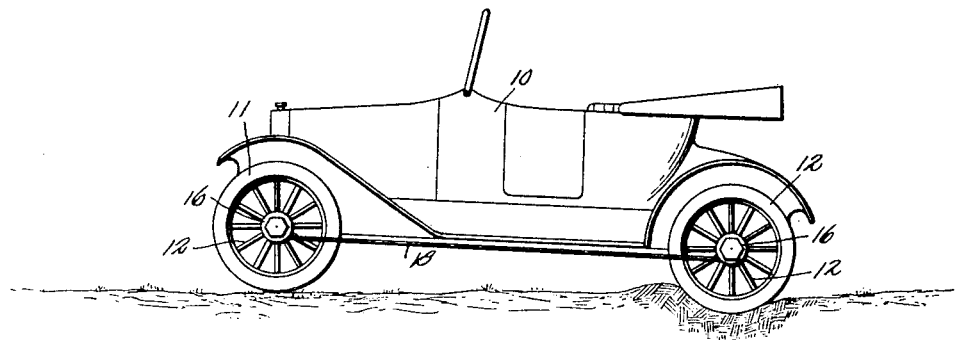
Figure 1 is a side elevation of an automobile equipped with the invention and illustrating the use of the same.

Whenever a vehicle is stalled, it is usually caused by the failure of the rear or driving wheels to obtain sufficient traction to advance the same that produces the trouble. The purpose therefore of the present invention is to provide a simple detachable means which may be quickly applied to the wheels for transmitting power from the rear wheel to the front wheels in order to set up a traction on the latter for extricating the rear wheels.

Referring to the drawings by characters of reference which denote like parts throughout the several views thereof, 10 designates an automobile provided with the usual front supporting and steering wheels 11 and the rear driving wheels 12, the former being mounted upon the steering knuckle spindles 13 of the steering knuckles 14. The rear wheels 12 which constitute the driving wheels are mounted on the usual drive axles 15.

The apparatus which constitutes the invention consists of extension hubs 16 secured to the outer side of each wheel and as illustrated each hub is provided with an eye 17 cast or otherwise provided thereon. Use is made of a cable 18 provided with snap hooks 19 or other suitable attaching means for connecting its opposite ends to the eyes 17.

In practically every form of motor vehicle now on the market, use is made of a differential gear to compensate for the difference in speed of the inner and outer driving wheels when making a turn. It is therefore obvious that when the rear wheels are stalled it is possible that the differential will tend to drive one wheel at a greater speed than the other, therefore, when the cables 18 are wound about the hubs 16 of the front wheel and secured to the eyes 17 of the rear hubs, an uneven pull may be exerted on the front wheels which would result in the throwing of the spindles of the opposite front wheels 11 out of alinement. In order to prevent such an occurrence and to provide a means for retaining the steering knuckle spindles 13 of the respective front wheels in alinement, the steering knuckle arms 20 of each steering knuckle 14 are transversely apertured as at 21 and a bolt 22 carried by a casing 23 is secured to the front axle adjacent each steering knuckle.

Figure 2:
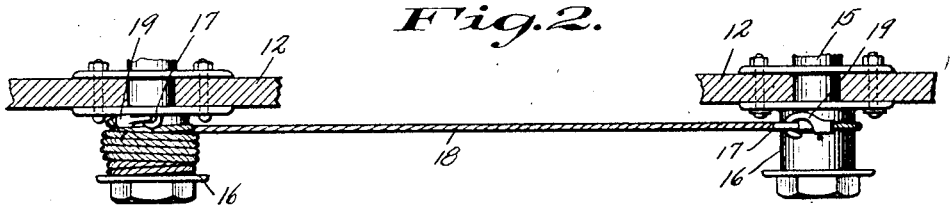
Fig. 2 is a fragmentary horizontal sectional view thereof.
Figure 3:
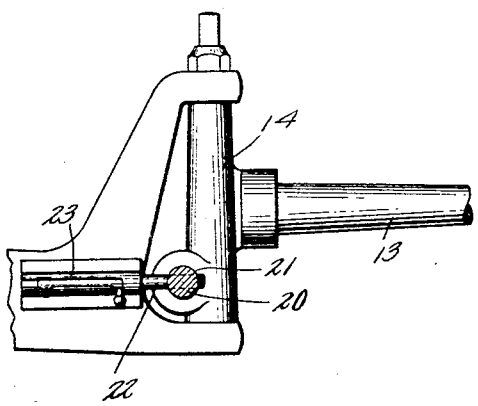
Fig. 3 is a fragmentary elevation of the means for retaining the steering knuckle spindles in alinement when the invention is in use.
Figure 4:
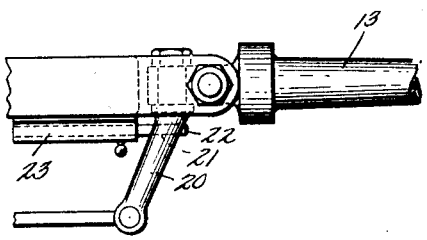
Fig. 4 is a plan view thereof.

In use of the device for extricating the rear driving wheels after same have become stalled, the steering wheel is operated to aline the spindles 13, the bolts 22 are then engaged in the apertures 21 of the steering knuckle arms 20. The snap hooks 19 of one extremity of each cable are engaged with the eyes 17 of the hub 16 of each front wheel and the cable is wound thereon as clearly illustrated in Fig. 2 of the drawings. The remaining end of each cable is then passed around the hub 16 of each rear wheel and its snap hook is engaged in the eyes 17 of said hubs. The engine is started and the clutch thrown in to effect revolutions of the rear wheels and hubs 16 thereby resulting in the winding of the cable upon the rear hubs and unwinding of the same from the front hubs. The driving of the front wheels will then function to set up sufficient traction to extricate the rear wheels. It will thus be seen that a simple and effective auxiliary traction device is produced which eliminates the necessity of anchoring a tackle to a stake driven in the ground as is the case in the majority of devices of this character now in general use.

If desired the snap hooks and eyes may be eliminated and the extremities of the cable may be tied to the spokes of the wheels or otherwise secured thereto.

While there has been illustrated and described a single and preferred embodiment of the invention, it is to be understood that variations and modifications in the details of construction which fall within the scope of the appended claims may be resorted to when found expedient.

Having thus described my invention, what I claim as new and desire to secure by Letters Patent, is,

1. An auxiliary traction device for motor vehicles, comprising drums secured respectively to the driving and steering wheels of the vehicle, and a cable adapted to be secured respectively to the drums of the driving wheels and wound upon and secured to the drums of the steering wheel, whereby upon rotation of the driving wheels, the cable will be wound upon said driving wheel drums and unwound from the steering wheel drums to drive the steering wheels from the driving wheels, and means for maintaining the spindles of the steering wheels in alinement and against turning movement.

2. An auxiliary traction device for motor vehicles comprising drums secured to the wheels of the vehicle, an eye provided on the drums, and cables having snap fasteners provided at the opposite ends, the snap fasteners at one end of each cable being adapted to be secured to the eyes of the driving wheel drums and adapted to be wound upon the steering wheel drums and secured with the snap fasteners of the opposite ends engaged with the eyes of said steering wheel drums, to constitute means whereby upon revolutions of the driving wheel, the cable will be unwound from the steering wheel drums and wound upon the driving wheel drums for driving the steering wheels from the driving wheels.

3. An auxiliary traction device for motor vehicles comprising drums secured to the steering and driving wheels of the vehicle, an eye provided on the drums, and cables having snap fasteners provided at the opposite ends, the snap fasteners at one end of each cable being adapted to be secured to the eyes of the driving wheel drums and adapted to be wound upon the steering wheel drums and secured with the snap fasteners of the opposite ends engaged with the eyes of the steering wheel drums, to consitute means whereby upon revolutions of the driving wheel, the cable will be unwound from the steering wheel drums and wound upon the driving wheel drums for driving the steering wheels from the driving wheels, and means for maintaining the spindles of said steering wheels in alinement to effect an even driving of the steering wheels from the driving wheels.

ALBERT H. GEDDES.